United States Patent
Miichi et al.

(10) Patent No.: US 9,157,750 B2
(45) Date of Patent: Oct. 13, 2015

(54) DEVICE HAVING TOUCH PANEL, RADAR APPARATUS, PLOTTER APPARATUS, SHIP NETWORK SYSTEM, INFORMATION DISPLAY METHOD AND INFORMATION DISPLAY PROGRAM

(75) Inventors: Tadahiro Miichi, Nishinomiya (JP); Sadao Sato, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 0 days.

(21) Appl. No.: 14/349,295

(22) PCT Filed: Oct. 3, 2011

(86) PCT No.: PCT/JP2011/005576
§ 371 (c)(1),
(2), (4) Date: Apr. 2, 2014

(87) PCT Pub. No.: WO2013/051046
PCT Pub. Date: Apr. 11, 2013

(65) Prior Publication Data
US 2014/0257689 A1    Sep. 11, 2014

(51) Int. Cl.
*G01C 21/32* (2006.01)
*B63B 49/00* (2006.01)
*G01S 19/35* (2010.01)
(Continued)

(52) U.S. Cl.
CPC .............. *G01C 21/32* (2013.01); *B63B 49/00* (2013.01); *G01C 21/3664* (2013.01); *G01S 7/12* (2013.01); *G01S 7/6272* (2013.01); *G01S 13/86* (2013.01); *G01S 19/35* (2013.01); *G06F 3/0485* (2013.01); *G06F 3/04883* (2013.01); *G09B 29/106* (2013.01); *G01S 15/96* (2013.01); *G06F 2203/04803* (2013.01)

(58) Field of Classification Search
CPC .... G01C 21/32; G01C 21/3664; B63B 49/00; G01S 19/35; G01S 7/12; G01S 15/96; G01S 7/6272; G01S 13/86; G06F 3/0485; G06F 2203/04803; G06F 3/04833; G09B 29/106
USPC ......................................................... 701/457
See application file for complete search history.

(56) References Cited

U.S. PATENT DOCUMENTS 6,529,218 B2 * 3/2003 Ogawa et al. ................. 715/799
6,628,299 B2 * 9/2003 Kitayama ..................... 345/635
(Continued)

FOREIGN PATENT DOCUMENTS

| JP | 201067139 A | 3/2010 |
| JP | 2011027482 A | 2/2011 |
| WO | 2007032318 A1 | 3/2007 |

OTHER PUBLICATIONS

ISA Japanese Patent Office, International Search Report of PCT/JP2011/005576, Mar. 19, 2012, WIPO, 4 pages.

*Primary Examiner* — Richard Camby
(74) *Attorney, Agent, or Firm* — Alleman Hall McCoy Russell & Tuttle LLP

(57) ABSTRACT

A touch panel device includes a display unit and a controller. The display unit displays, on a map or a nautical chart, a position acquired from a GNSS sensor and a symbol set on the map or the nautical chart. The controller controls, when an operation of specifying the symbol is detected, an auxiliary tool to appear on a display screen of the display unit, the auxiliary tool for recognizing a touch operation of moving the symbol.

14 Claims, 8 Drawing Sheets

(51) Int. Cl.
*G01S 7/12* (2006.01)
*G06F 3/0485* (2013.01)
*G09B 29/10* (2006.01)
*G06F 3/0488* (2013.01)
*G01C 21/36* (2006.01)
*G01S 7/62* (2006.01)
*G01S 13/86* (2006.01)
*G01S 15/96* (2006.01)

(56) References Cited

U.S. PATENT DOCUMENTS

| | | |
|---|---|---|
| 6,833,851 B1 | 12/2004 | Brunk |
| 7,543,241 B1 | 6/2009 | Brunk |
| 2008/0036743 A1 | 2/2008 | Westerman et al. |
| 2015/0035772 A1* | 2/2015 | Asahara et al. ............... 345/173 |

* cited by examiner

DEVICE HAVING TOUCH PANEL, RADAR APPARATUS, PLOTTER APPARATUS, SHIP NETWORK SYSTEM, INFORMATION DISPLAY METHOD AND INFORMATION DISPLAY PROGRAM

TECHNICAL FIELD

The present invention mainly relates to a device having a touch panel, which is able to display symbols set on a map or a nautical chart.

BACKGROUND ART

Conventionally, devices having a touch panel (hereinafter, may simply be referred to as the touch panel devices) which can recognize a touch operation on a display screen have been known. Patent Document 1 discloses a method of performing predetermined processing on such kind of touch panel device, a touch pad and the like according to a touch operation content (touching gesture), and discloses specific examples of the predetermined processing.

Patent Documents 2 and 3 disclose display devices to be installed in ships. Each of such display devices acquires positional information from a GPS antenna and displays an image showing, for example, a nautical chart around the ship concerned, while it acquires a measurement result from a depth finder and displays an image showing a state of the sea bottom area.

Such display devices of Patent Documents 2 and 3 create a navigation route and display it on a nautical chart. Such a navigation route is created such as to connect a departing point (or the location of the ship concerned) and a destination point via a waypoint (stopover point).

REFERENCE DOCUMENTS OF CONVENTIONAL ART

Patent Document(s)

Patent Document 1: US2008/0036743 A1
Patent Document 2: U.S. Pat. No. 6,833,851
Patent Document 3: U.S. Pat. No. 7,543,241

DISCLOSURE OF THE INVENTION

Problems to be Solved by the Invention

Meanwhile, in a case of revising the navigation route by using a mouse or a physical key, it is required to select a mode for revising the navigation route, select the destination or the waypoint to be revised, and then specify a revised location. As described above, a plurality of times of operations are required in the case of using the mouse or the physical key.

On the other hand, in a case of using a touch panel device capable of detecting a touch operation, for example, it is required to press the destination or the waypoint to be revised for over a predetermined period of time and then drag it to a revised location. As described above, a simple and instinctive operation becomes possible in the case of using the touch panel device.

However, in the case of using the touch panel device, the operation is performed such as to drag the waypoint displayed on the display screen. Therefore, there have been cases where a finger or the like covers around the waypoint during the operation, and detailed location specification becomes difficult.

The present invention is made in view of the above situations and aims to provide a touch panel device which is able to move a location of a symbol set on a map or a nautical chart, while confirming the location of the symbol.

Summary and Effect(s) of the Invention

Problems to be solved by the invention are described above, and means for solving the problems and effects thereof will be described below.

According to a first aspect of the invention, a device having a touch panel with the following configuration is provided. That is, the device having the touch panel includes a display unit and a controller. The display unit displays, on a map or a nautical chart, a position acquired from a GNSS sensor and a symbol set on the map or the nautical chart. The controller controls, when an operation of specifying the symbol is detected, an auxiliary tool to appear on a display screen of the display unit, the auxiliary tool for recognizing a touch operation of moving the symbol.

Thus, the symbol can be moved without a user's touching of the symbol on the display screen. Therefore, since the symbol is not covered by, for example, a finger, the symbol can be moved while the user checks the position of the symbol.

With the above device having the touch panel, the controller preferably scrolls the map or the nautical chart to secure a display space for the auxiliary tool when appearing the auxiliary tool.

Thus, since the display space can be secured without changing the appearing position of the auxiliary tool, it can be prevented that the user gets confused about the appearing position of the auxiliary tool.

With the above device having the touch panel, it is preferred to have the following configuration. That is, the appearing position of the auxiliary tool is determined according to a displayed position of the specified symbol. When at least a part of the auxiliary tool is detected to be out of the display screen, the controller scrolls the map or the nautical chart.

Thus, the auxiliary tool can surely be displayed within the display screen.

With the above device having the touch panel, the controller preferably controls the auxiliary tool to appear below a displayed position of the specified symbol.

Thus, since the symbol, the nautical chart and the like becomes less likely to be covered by a finger, an arm or the like, degradation of visibility thereof can be prevented.

With the above device having the touch panel, it is preferred to have the following configuration. That is, at least two candidates for an appearing position of the auxiliary tool are set. The controller determines the appearing position of the auxiliary tool according to the displayed position of the specified symbol.

Thus, the auxiliary tool can appear such as not to overlap with the symbol by suitably determining the appearing position.

With the above device having the touch panel, an amount of movement on the display screen caused by a moving operation performed on the auxiliary tool is preferably different from a moving amount of the symbol on the display screen.

Thus, a fine adjustment of the position of the symbol can be performed by, for example, setting the moving amount of the symbol on the display screen smaller than the moving amount (operation amount) of the moving operation on the display screen. Moreover, the symbol can be moved by a large amount while reducing the size of the displayed auxiliary tool, by increasing the moving amount of the symbol to be larger than the operation amount.

With the above device having the touch panel, a relation between a displayed position of the specified symbol and an appearing position of the auxiliary tool is preferably fixed.

Thus, the user can easily know the appearing position of the auxiliary tool. Therefore, the user can perform the operation of moving the symbol upon confirming the next position to touch.

With the above device having the touch panel, the controller preferably moves the auxiliary tool according to a control by a user and moves the symbol such as to follow the movement of the auxiliary tool.

Thus, the symbol can be moved by a large amount while reducing the size of the displayed auxiliary tool. Therefore, degradation of visibility of the nautical chart and the like by the auxiliary tool can be prevented.

The device is preferred to be installed in a ship.

Thus, the above effects can be exerted with the device having the touch panel to be installed in a ship.

According to other aspects of the invention, a radar apparatus comprising the device having the touch panel, a plotter apparatus comprising the device having the touch panel, and a ship network system comprising the device having the touch panel are provided.

Thus, the effects of the invention can be exerted with the radar apparatus, the plotter apparatus, the ship network system.

According to a second aspect of the invention, a method of displaying information having the following configuration is provided. That is, the method of displaying information includes displaying, on a map or a nautical chart, a position acquired from a GNSS sensor and a symbol set on the map or the nautical chart, and controlling, when an operation of specifying the symbol is detected, an auxiliary tool to appear on a display screen of the display unit, the auxiliary tool for recognizing a touch operation of moving the symbol.

Thus, the symbol can be moved without a user's touching of the symbol on the display screen. Therefore, since the symbol is not covered by, for example, a finger, the symbol can be moved while the user checks the position of the symbol.

According to a third aspect of the invention, an information displaying program having the following configuration is provided. That is, the information displaying program causes a computer to display, on a map or a nautical chart, a position acquired from a GNSS sensor and a symbol set on the map or the nautical chart, and control, when an operation of specifying the symbol is detected, an auxiliary tool to appear on a display screen of the display unit, the auxiliary tool for recognizing a touch operation of moving the symbol.

Thus, the symbol can be moved without a user's touching of the symbol on the display screen. Therefore, since the symbol is not covered by, for example, a finger, the symbol can be moved while the user checks the position of the symbol.

According to a fourth aspect of the invention, a device having a touch panel with the following configuration is provided. That is, the device having the touch panel includes a display unit and a controller. The display unit displays a symbol set on a map or a nautical chart. The controller controls, when an operation of specifying the symbol is detected, an auxiliary tool to appear on a display screen of the display unit, the auxiliary tool for recognizing a touch operation of moving the symbol.

Thus, the symbol can be moved without a user's touching of the symbol on the display screen. Therefore, since the symbol is not covered by, for example, a finger, the symbol can be moved while the user checks the position of the symbol.

MODE(S) FOR CARRYING OUT THE INVENTION

Figure 1:
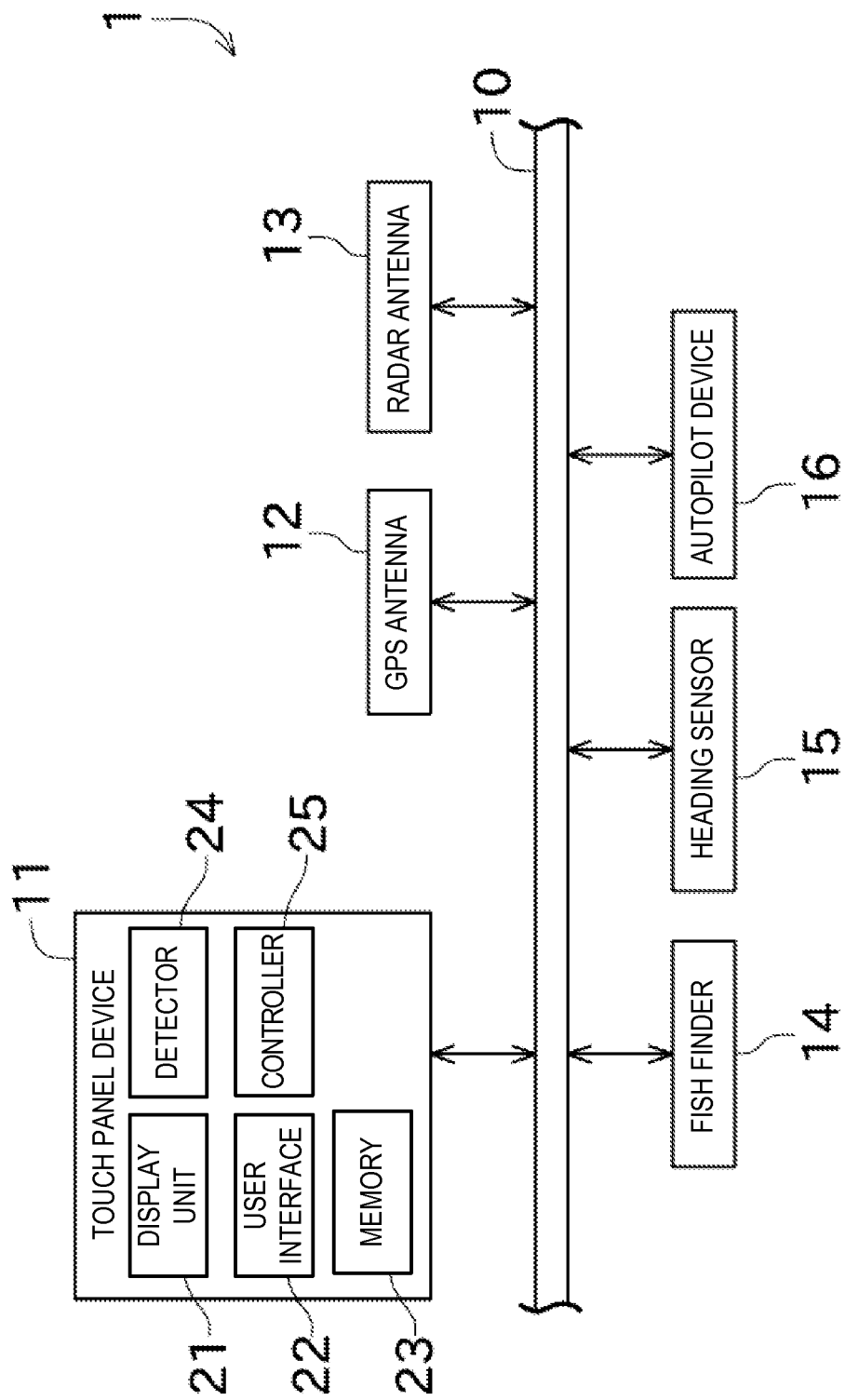
FIG. 1 is a block diagram illustrating an overall configuration of a ship instrument network system.
Figure 2:
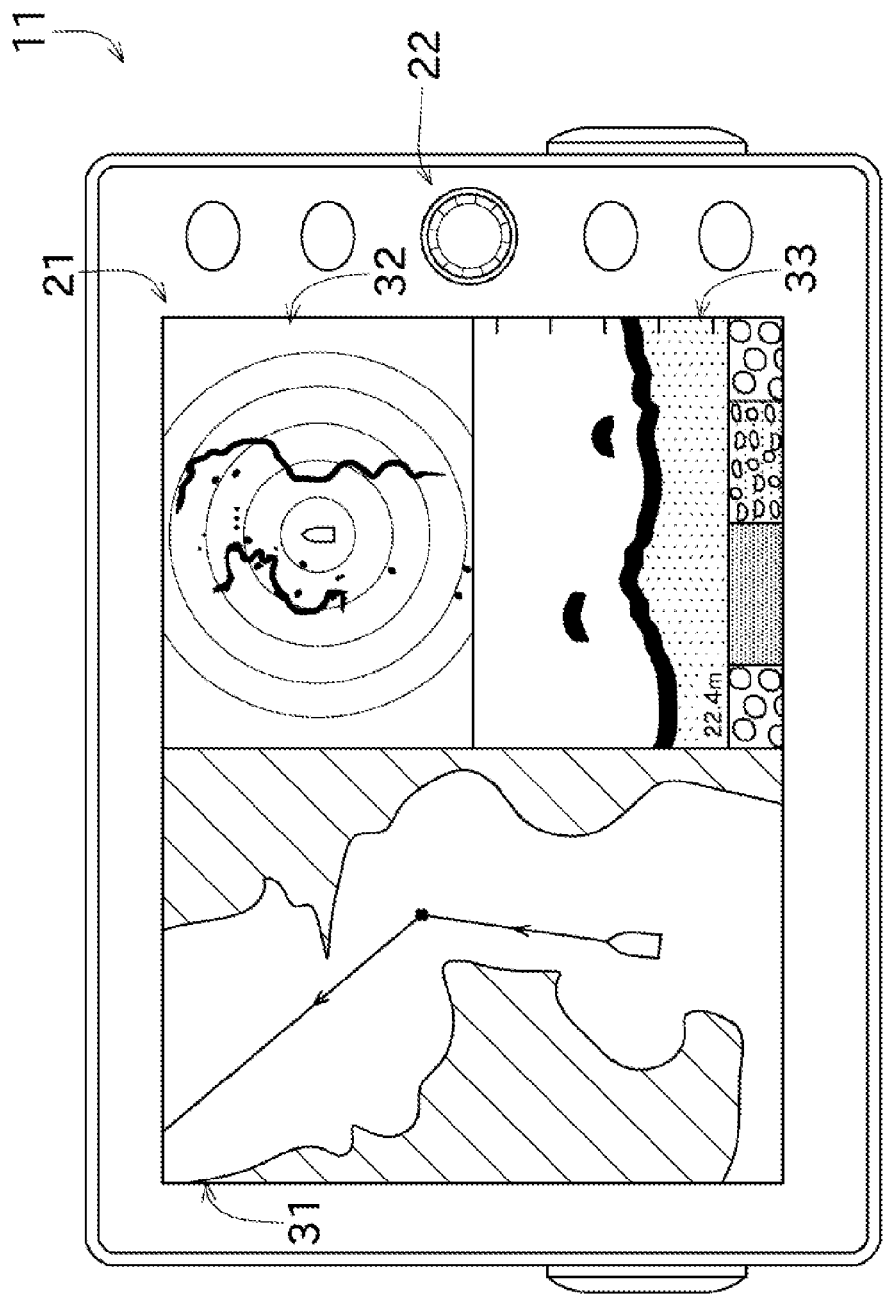
FIG. 2 is a front view of a touch panel device.

Next, one embodiment of the present invention is described with reference to the drawings. FIG. 1 is a block diagram illustrating an overall configuration of a ship instrument network system 1. FIG. 2 is a front view of a touch panel device 11.

The ship instrument network system 1 of this embodiment includes a plurality of ship instruments connected to a ship network 10. The ship instruments can exchange, for example, detected information via the ship network 10. As the standard of the ship network 10, LAN (Local Area Network) and CAN (Controller Area Network) can be adopted, for example.

As illustrated in FIG. 1, the ship instrument network system 1 of this embodiment includes a device having a touch panel (hereinafter, simply be referred to as the touch panel device) 11, a GPS antenna (GNSS sensor) 12, a radar antenna 13, a fish finder (acoustic sensor) 14, a heading sensor 15, and an autopilot device 16.

The touch panel device 11 is configured to create and display an image (sensor image) based on information detected by the other ship instruments (sensors), and detect a touch operation on a display screen and perform processing according to the detection result. Specifically, the touch panel device 11 includes a display unit 21, a user interface 22, a memory 23, a detector 24, and a controller 25.

The display unit 21 is comprised of, for example, a liquid crystal display, and can display the sensor image, various setting screens and the like on the display screen as described above.

The user interface 22 is comprised of hardware keys, such as a rotary key to which a clockwise or counterclockwise rotational operation can be performed, and a menu key for calling out a menu screen. Note that, the touch panel device 11 can be performed an input and an instruction by a touch operation on the display screen. Therefore, the number of keys of the user interface 22 can be reduced.

The memory 23 stores, for example, contents of program(s) to be executed by the controller 25, nautical chart information, and navigation route(s) set by a user.

The detector 24 detects the touch operation performed on the display screen by the user. In this embodiment, a projected capacitance system is used as a system for detecting the touch operation. This system is configured such that a plurality of electrodes with high transparency are disposed on a display panel and a touched position is detected based on a change of an electric capacity of each electrode caused when a fingertip approaches the panel. With this configuration, not only the touched position but also a finger motion in a touching state (shifting of the touched position) can be detected. Moreover, when two or more positions are touched simultaneously, the detector 24 can also detect the respective touched positions and shifting of the respective touched positions. The touched position(s) and the shifting of the touched position(s) detected by the detector 24 are outputted to the controller 25. Note that, the system for detecting the touch operation is not limited to the projected capacitance system, and any other suitable system may be adopted. Moreover, other than the touch operation by a finger, a configuration in which a touch operation by a tapered stick-like member is detected may be adopted, for example.

The controller 25 creates the sensor image (a radar image, a nautical chart around the ship, etc.) based on stored contents in the memory 23 and information received from other ship instrument(s), and displays it on the display unit 21. The controller 25 receives information from a plurality of ship instruments and creates a plurality of sensor images. The controller 25 can switch a screen mode between a mode for displaying only one of the plurality of sensor images on the display screen (full screen mode) and a mode for dividing the display screen and displaying a plurality of sensor images thereon (divided screen mode, see FIG. 2).

Moreover, the controller 25 performs matching the shifting of the touched position detected by the detector 24 among predetermined touch operation contents (touch gestures), and thereby, identifies which touch gesture is performed by the user. Then, the controller 25 performs processing corresponding to the identified touch gesture.

One specific example of the touch gestures includes a "drag operation." The drag operation is a touch gesture of moving a touching finger on the display screen (normally one finger) to a predetermined direction without separating from the display screen. Scrolling of the image is normally associated with this drag operation. Note that, the drag operation includes an operation of quickly moving the finger while touching the display screen (flick operation). Moreover, another example of the touch gestures includes a "pinch operation." The pinch operation is an operation of, without separating two touching fingers from the display screen, bringing the fingers close to each other (pinch in) or separating them from each other (pinch out). Processing of changing a scale of the image is normally associated with the pinch operation. Note that, the controller 25 can also indentify other various touch gestures than the examples given above.

The GPS antenna 12 receives positioning signals from GPS satellites (GNSS satellites) and outputs them to, for example, the touch panel device 11 via the ship network 10. The controller 25 of the touch panel device 11 obtains a location of the ship (specifically, a location of the GPS antenna and a terrestrial reference absolute position) based on the positioning signals. Note that, a configuration in which the calculation for obtaining the location based on the positioning signals is performed on the GPS antenna 12 side and the ship location is outputted to the touch panel device 11 may be adopted.

The touch panel device 11 can exert a function as a navigation device based on the obtained ship location and the nautical chart stored in the memory 23. Specifically, based on the acquired ship location and the nautical chart stored in the memory 23, the controller 25 can superimpose the ship location on the nautical chart and display it on the display unit 21.

Moreover, the controller 25 can obtain a ground speed and a trace of the ship by utilizing ship locations changed with time, and display them on the display unit 21. Further, the controller 25 can create the navigation route and display it on the display unit 21 by a user selecting a destination and a waypoint (stopover point) with the touch operation (see a first sensor image 31 illustrated in FIG. 2).

The radar antenna 13 transmits a microwave and receives a reflection wave from an object. The reflection wave is suitably signal-processed and then outputted to the touch panel device 11. The touch panel device 11 creates a radar image based on the reflection wave. Specifically, the controller 25 of the touch panel device 11 obtains a distance of the object based on a time length from the transmission of the microwave to the reception of the reflection wave. Moreover, the controller 51 obtains a direction in which the object exists, based on a direction to which the microwave is transmitted. The controller 25 creates the radar image as described above and displays it on the display unit 21 (see a second sensor image 32 illustrated in FIG. 2).

The fish finder 14 is comprised of a transducer and an analyzer. The transducer is installed to the bottom of the ship, and discharges an ultrasonic wave directly below into the sea and receives the reflection wave from a sea bottom or a school of fish. The analyzer creates fish finding data (date acquired by the fish finder and data of the school of fish or the sea bottom based on the reflection wave). Moreover, the fish finder 14 of this embodiment has a function to determine a state of the sea bottom (bottom sediment type) based on the acquired fish finding data. Specifically, the analyzer can determine which kind the sea bottom falls in with high possibility, among rocks, gravel (stones), sand, and mud, by analyzing the received reflection wave. The fish finding data and the determined bottom sediment type are outputted to the touch panel device 11. Then, the controller 25 of the touch panel device 11 creates a third sensor image 33 based on the received data (see FIG. 2) and displays it on the display unit 21. In the third sensor image 33, the vertical axis indicates the fish finding data and the horizontal axis indicates a timing at which the fish finding data is acquired (the data is older as it goes toward the left end of the display screen).

The heading azimuth 15 is configured to detect a heading of the ship (a direction to which a bow of the ship is heading) by a terrestrial reference absolute position. Generally, a ship travels forward, toward its bow direction. Therefore, it can be said that the heading sensor 15 detects an azimuth of a forward direction of a hull of the ship. For example, a magnetic azimuth sensor or a GPS compass may be used as the heading sensor 15.

The autopilot device 16 is a device for automatically controlling a rudder so that the ship travels along the set navigation route. Specifically, the autopilot device 16 obtains how much the bow of the ship is to be changed based on the heading acquired from the heading sensor 15 and the navigation route acquired from the touch panel device 11. Then, the autopilot device 16 coincides the course of the ship with the navigation route by changing an angle of the rudder according to the obtained value.

The ship instrument network system 1 of this embodiment is configured as described above. Note that, the ship instruments constituting the ship instrument network system 1 are arbitrary, and a configuration in which ship instrument(s) other than those described above are connected, or a configuration in which a plurality of similar types of ship instruments are connected may be adopted. Moreover, a configuration in which the processing of the data acquired by the ship instruments is performed by the ship instrument concerned may be adopted, or a configuration in which the processing of the data acquired by the ship instruments is performed by the controller 25 of the touch panel device 11 may be adopted.

Next, an operation performed by the user and processing performed by the controller 25 in order to change the location of the waypoint are described with reference to FIGS. 3 to 6. FIGS. 3 to 6 are views illustrating the display screen when changing the location of the waypoint.

Figure 3:
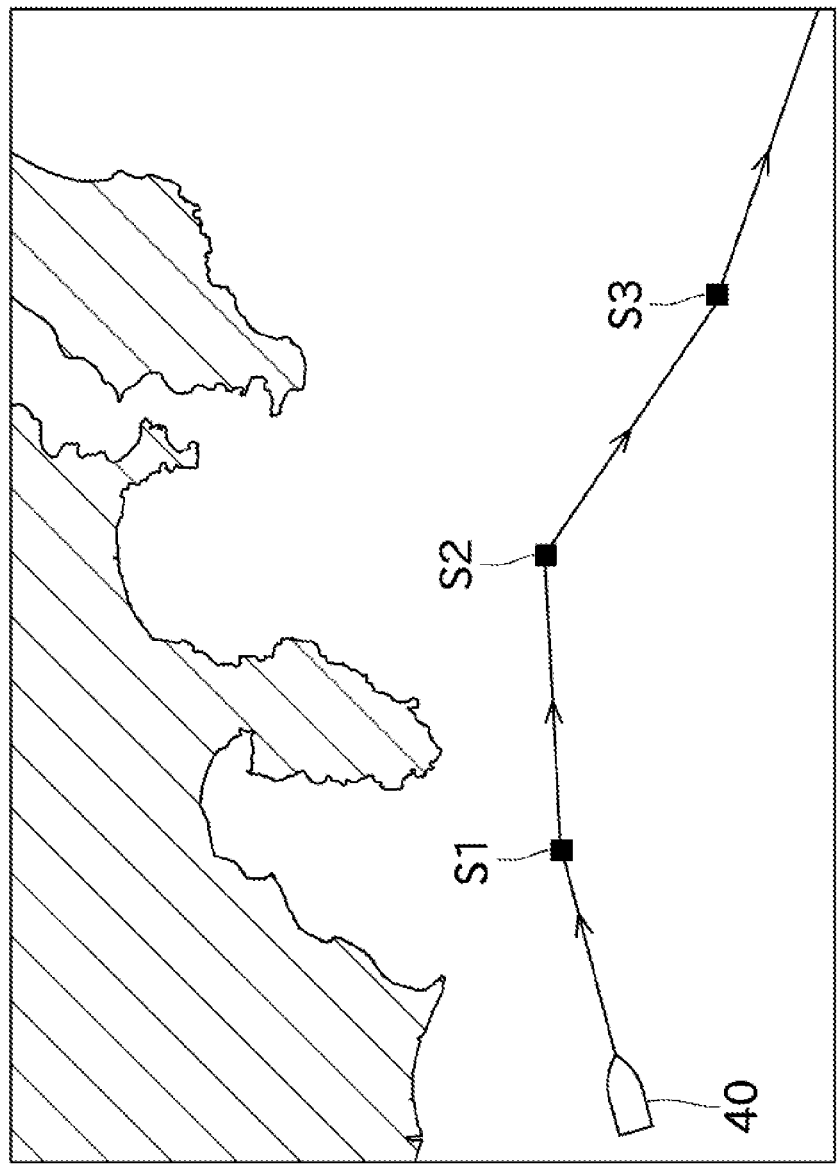
FIG. 3 is a view illustrating a display screen displaying a nautical chart and a navigation route.

In the example of FIG. 3, the first sensor image 31 is displayed on the display screen. Specifically, as illustrated in FIG. 3, a ship symbol 40 indicating the location of the ship, and symbols S1, S2 and S3 indicating waypoints are displayed on the nautical chart. When changing the location of the waypoint, the user specifies the symbol of the waypoint desired to be changed. The specifying of the symbol is performed by, for example, touching the symbol over a predetermined period of time, or controlling the user interface 22 to move a predetermined cursor to the symbol and pushing an enter key.

Figure 4:
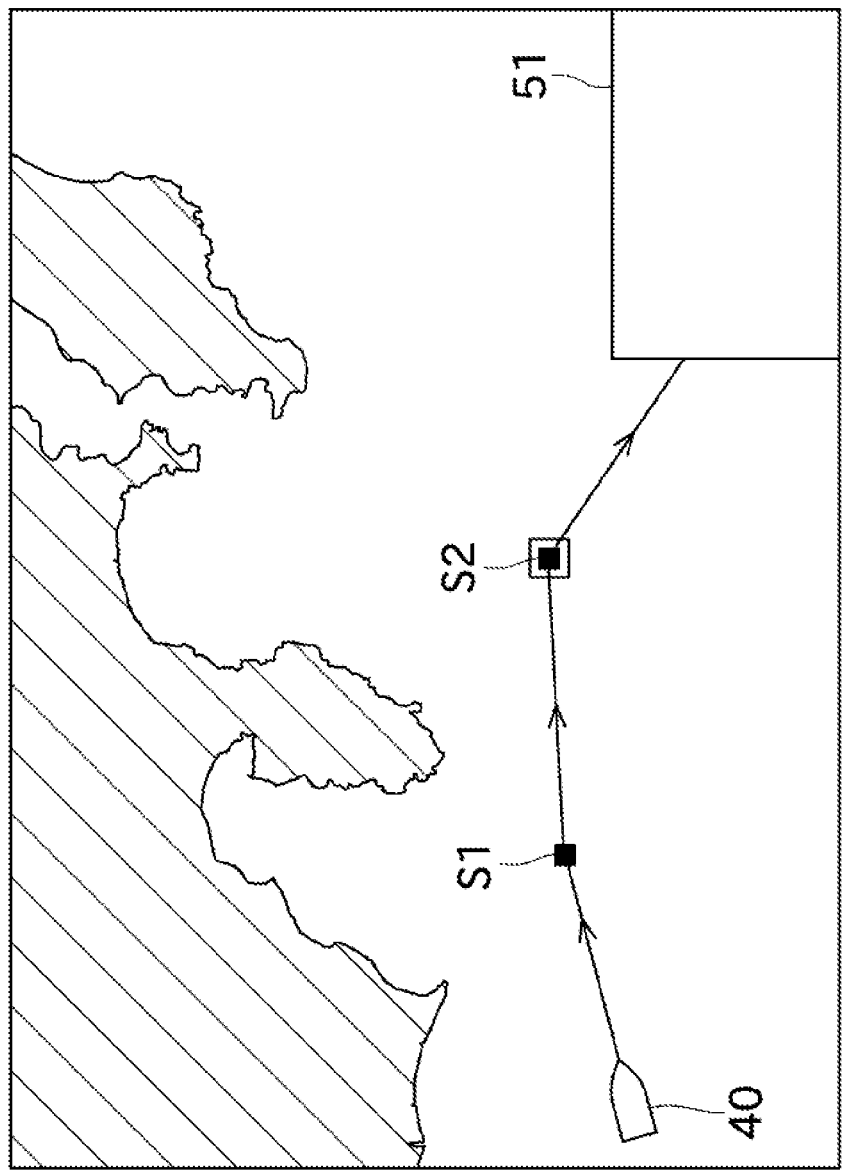
FIG. 4 is a view illustrating the display screen when a symbol is specified and an auxiliary tool appears.

The controller 25, upon detecting that the symbol is specified, controls an auxiliary tool for recognizing the touch operation (drag operation in this embodiment) of moving the symbol, to appear on the display screen. In a case where the symbol S2 is specified as illustrated in FIG. 4, the controller 25 controls a rectangular-shaped auxiliary tool 51 to appear in a right-bottom corner of the display screen.

Figure 5:
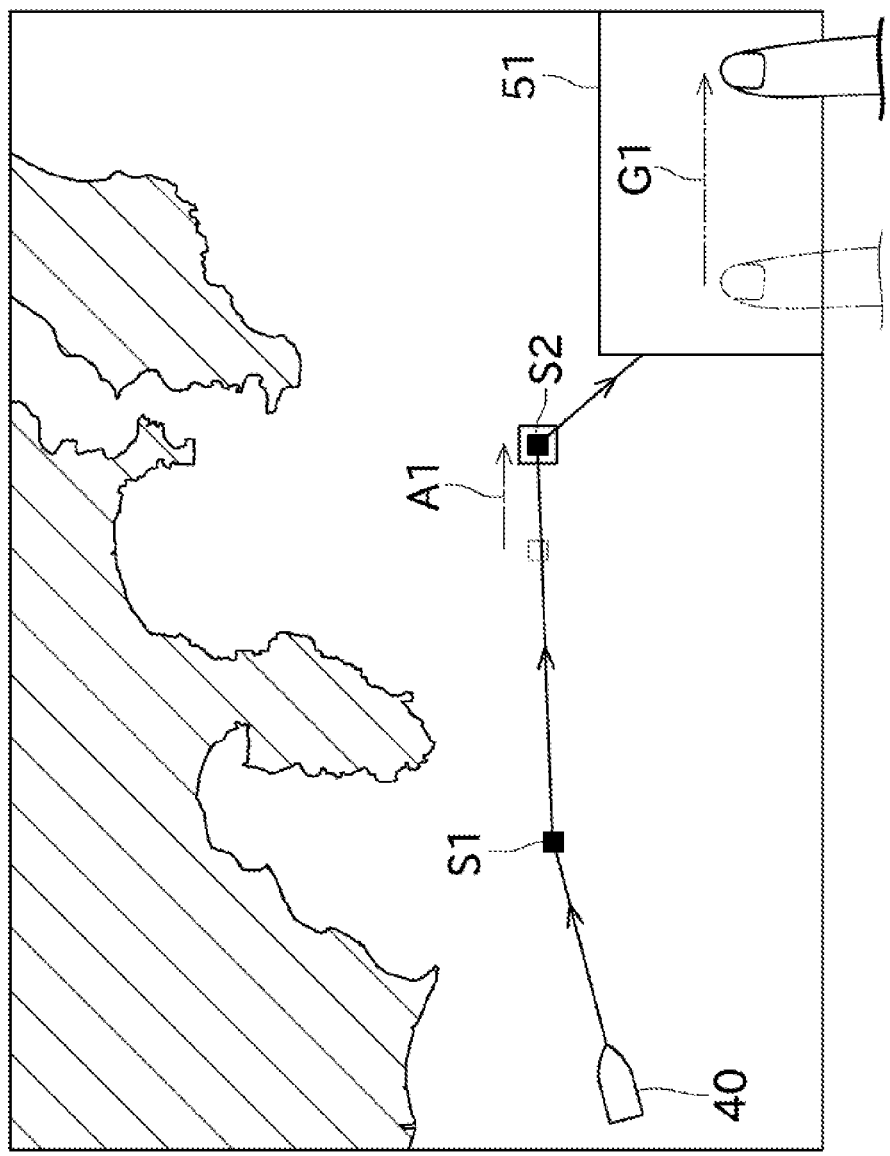
FIG. 5 is a view illustrating how the symbol is moved by using the auxiliary tool.
Figure 6:
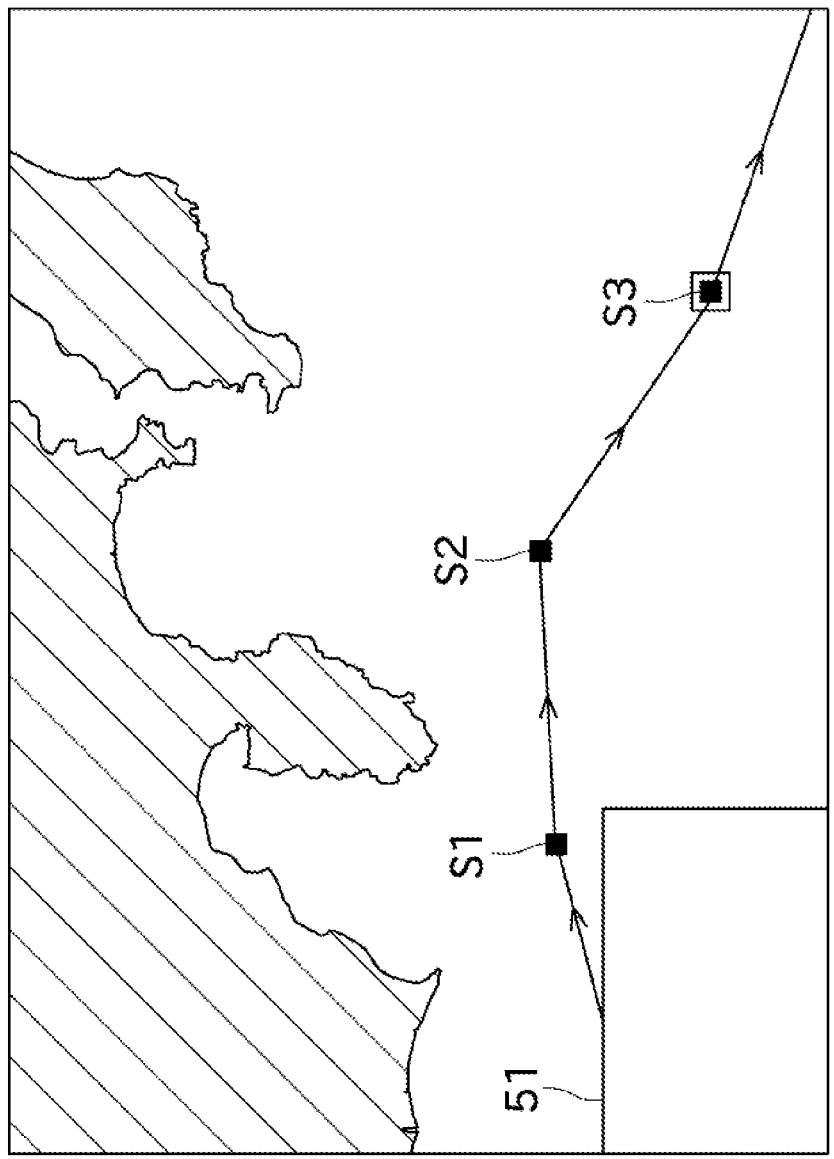
FIG. 6 is a view illustrating that the appearing position of the auxiliary tool changes when a different symbol is specified.

The user can move the symbol S2 by directly dragging the symbol S2 and also by dragging on the auxiliary tool 51. Moreover, in this embodiment, as illustrated in FIG. 5, a configuration in which a moving amount A1 of the symbol S2 on the display screen is smaller than a dragging amount G1 in the drag operation performed on the auxiliary tool 51 is adopted.

With this configuration, by using the auxiliary tool 51, the position of the symbol S2 can be changed highly accurately while preventing the symbol S2 from being covered by the finger. Moreover, the position of the symbol S2 may be changed in a manner that the position of the symbol S2 is roughly determined by directly dragging the symbol S2 and then specifically determined by the auxiliary tool 51. Therefore, a highly accurate positional specification with an efficient operation becomes possible.

Then, the user fixes the position of the symbol S2 by moving the symbol S2 to a desired position and removing his/her hand away from the auxiliary tool 51. Note that, the method of fixing the position of the symbol S2 is arbitrary, and other than the above method, a configuration in which a touch gesture to a predetermined key of the user interface 22 or the auxiliary tool 51 is used, and a configuration in which an enter key is displayed near the auxiliary tool 51 and the position of the symbol S2 is fixed when the enter key is touched may be considered, for example.

The controller 25 performs processing of automatically erasing the auxiliary tool 51 from the display screen after the position of the symbol S2 is fixed. As described above, the auxiliary tool 51 is configured such that it is normally not displayed and is only displayed when moving the symbol. Therefore, since the auxiliary tool does not occupy the display screen, the display area can effectively be utilized.

Moreover, in this embodiment, two positions in the right-bottom corner and the left-bottom corner of the display screen are set as candidates for the appearing position of the auxiliary tool 51. Therefore, the controller 25 determines the appearing position of the auxiliary tool 51 according to the displayed position of the specified symbol. Specifically, although the controller 25 normally controls the auxiliary tool 51 to appear in the right-bottom corner, if a symbol positioned within a predetermined distance from the right-bottom corner is specified (e.g., the symbol S3 in FIG. 4), the controller 25 controls the auxiliary tool 51 to appear in the left-bottom corner (see FIG. 6).

With this configuration, it can be prevented that the auxiliary tool 51 and the symbol S3 overlap on each other, while avoiding the appearing position of the auxiliary tool 51 from changing as much as possible to prevent causing confusion to the user. Note that, the method of determining in which corner the auxiliary tool 51 is to be controlled to appear is arbitrary, and a configuration in which the auxiliary tool 51 appears in the left-bottom corner when a symbol positioned on the right side from the center is specified and the auxiliary tool 51 appears in the right-bottom corner when the symbol positioned on the left side from the center is specified may be adopted, for example. Moreover, the number and the positions of the candidates for the appearing position of the auxiliary tool 51 are arbitrary, and any other suitable determining method may be used according to the number and the positions of the candidates, the environment of usage or the like. For example, in the case where it is certain that the user stays on the right side of the touch panel device 11, by displaying the auxiliary tool 51 in the right half of the display screen, the visibility of the display screen can be prevented from degrading.

Figure 7:
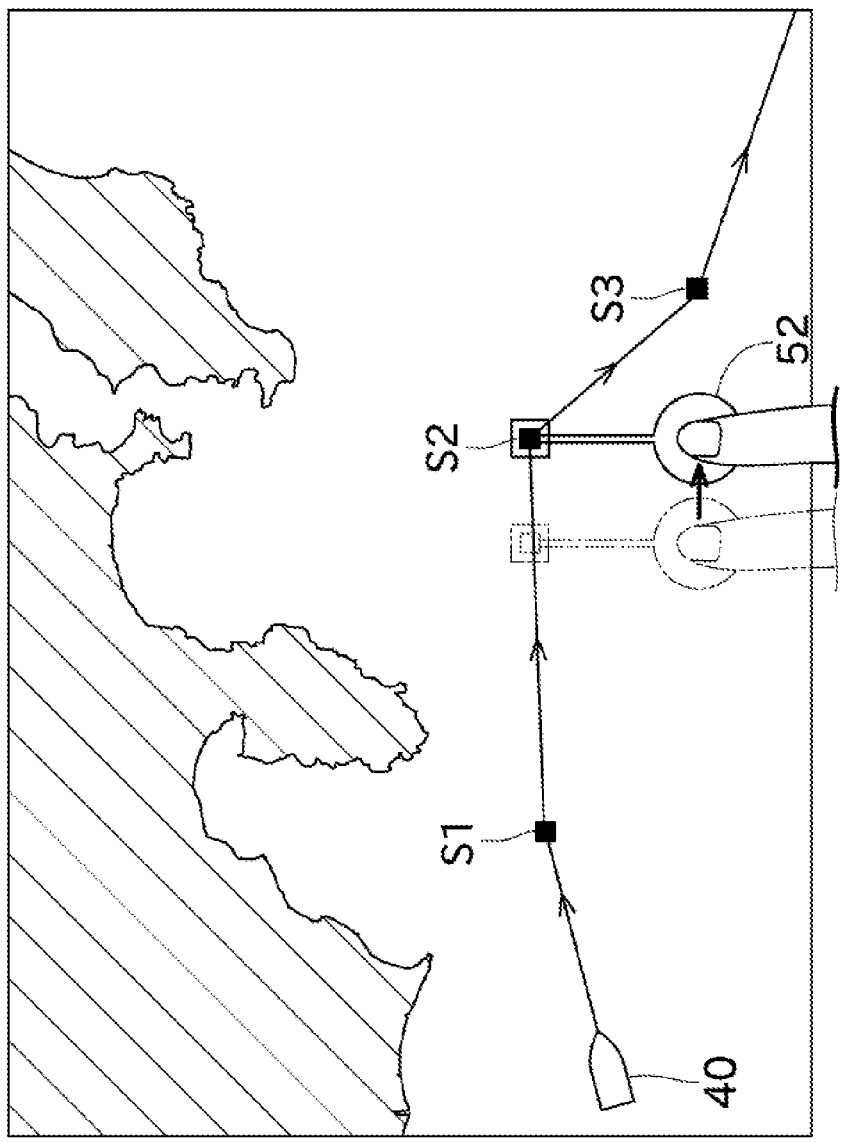
FIG. 7 is a view illustrating another example of the auxiliary tool.
Figure 8:
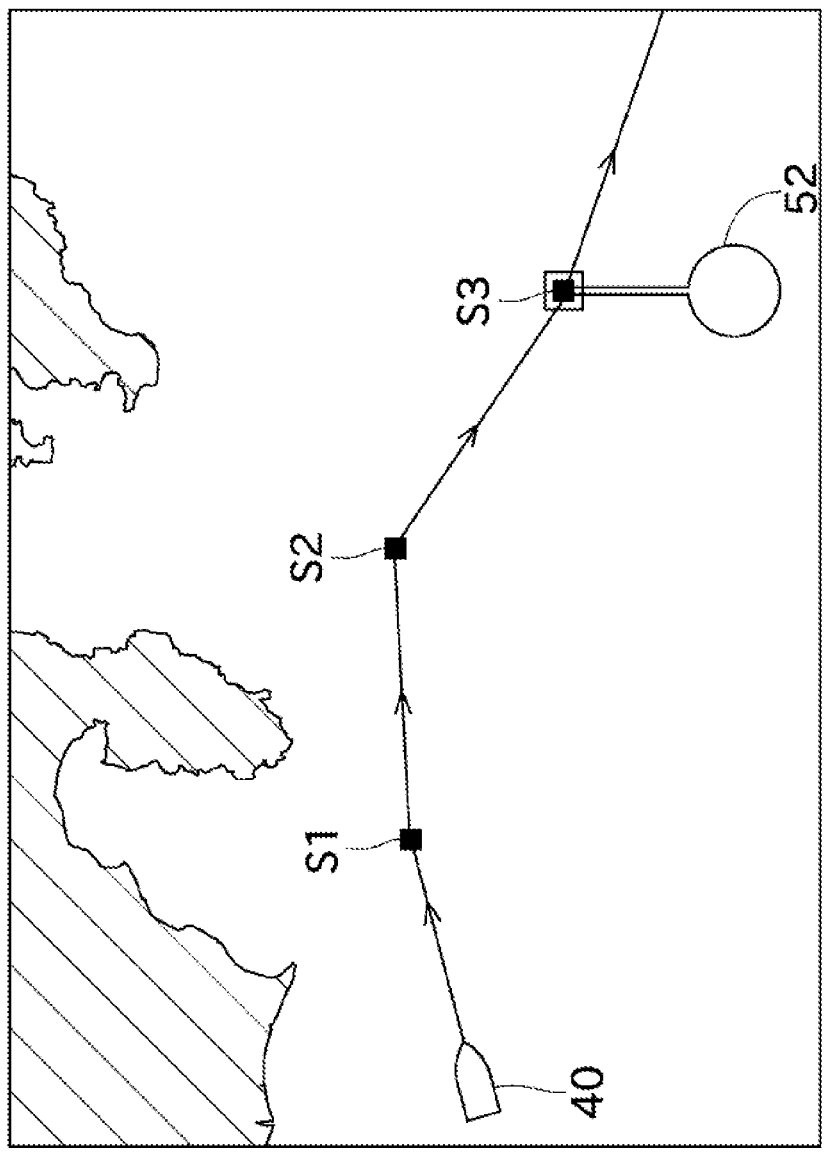
FIG. 8 is a view illustrating how scrolling is performed to display the auxiliary tool.

Next, another embodiment is described with reference to FIGS. 7 and 8. FIGS. 7 and 8 are views illustrating another example of the auxiliary tool.

This embodiment is different from the above embodiment in the shape and the displayed position of the auxiliary tool. The controller 25 of this embodiment, upon detecting that the symbol is specified, displays a circular auxiliary tool 52 at a position directly below the specified symbol S2 with a predetermined distance therefrom (see FIG. 7). Note that, the predetermined distance is fixed regardless of the specified symbol. In other words, in this embodiment, a positional relation between the displayed position of the specified symbol S2 and the appearing position of the auxiliary tool 52 is fixed. Moreover, the auxiliary tool 52 is connected to the symbol S2 by a linear graphic for easier understanding of the target symbol to be moved.

The user can move the symbol S2 by touching the auxiliary tool 52 and dragging it thereon (see FIG. 7). Note that, in this embodiment, the dragging amount and the moving amount of the symbol are configured to be the same as each other. Moreover, in this embodiment, even after the symbol is moved, the positional relation that "the auxiliary tool 52 is positioned directly below the specified symbol S2 with the predetermined distance therefrom" remains. In other words, the controller 25 is configured to move the auxiliary tool 52 according to the operation by the user and move the symbol S2 such as to follow the movement of the auxiliary tool 52 (to keep the relative positional relation).

Thus, the symbol S2 can be moved greatly with a simple operation while preventing degradation of the visibility of the nautical chart by reducing the size of the displayed auxiliary tool 52. Moreover, since the symbol S2 is always located upward of the position of the dragging finger (the position of the auxiliary tool 52), the position of the symbol S2 can always easily be confirmed.

Meanwhile, as described above, the appearing position of the auxiliary tool 52 is below the displayed position of the symbol by a predetermined distance. Therefore, there are cases where, if the symbol near the bottom end of the display screen (e.g., the symbol S3) is selected, the display space for the auxiliary tool 52 is not secured (reaches out of the display screen) when appearing. In this regard, when at least a part of the auxiliary tool 52 reaches out of the display screen, the controller 25 of this embodiment is configured to scroll the nautical chart to secure the display space thereof. For example, when the symbol S3 in FIG. 7 is selected, the controller 25 automatically scrolls the nautical chart to secure the display space for allowing the auxiliary tool 52 to appear (see FIG. 8).

Note that, the scroll processing may be configured such as to be performed by the touch panel device 11 which is configured to control the auxiliary tool 51 to appear in the right-bottom corner every time, for example. Note that, the controller 25 of the touch panel device 11, upon detecting that the displayed position of the specified symbol and the appearing position of the auxiliary tool 51 are overlapped on each other, scrolls up the nautical chart to secure the display space for allowing the auxiliary tool 52 to appear.

As described above, the touch panel device 11 includes the display unit 21 and the controller 25. The display unit 21 displays, on the nautical chart, the location of the ship acquired from the GNSS sensor, and the symbols S1, S2 and S3 set on the nautical chart. The controller 25, upon detecting the operation of specifying the symbol S2, controls the auxiliary tool 51 for recognizing the touch operation of moving the symbol S2, to appear on the display screen.

Thus, the symbol can be moved without the user's touching of the symbol on the display screen. Therefore, the symbol is not covered by, for example, a finger, and thus, the symbol can be moved while the user checks the position of the symbol.

Although the preferred embodiments of the present invention are described above, the above configurations may be modified as follows, for example.

In the above embodiments, the examples in which the symbol indicating the waypoint is moved are described; however, the similar method may be used to move, for example, a symbol indicating the departing point or the destination point, or a symbol indicating any point set by the user.

In the above embodiments, the implementation example in which the GPS is used as one example of the GNSS is described; however, it is obvious that a configuration in which a different kind of GNSS is used may be adopted.

The shapes of the auxiliary tools 51 and 52 are not limited to those illustrated above, and they may be changed to shapes of rounded rectangles, triangles or the like.

The auxiliary tool 52 may be displayed obliquely below, sideways or the like with respect to the symbol S2, instead of directly below the symbol S2. The directions of automatic scrolling for securing the display spaces for the auxiliary tools 51 and 52 are also not limited to the up-and-down directions, and may be changed to a configuration of scrolling obliquely upward, sideways or the like.

In the example of FIG. 4, a configuration may be adopted in which the user specifies the plurality of symbols S1 and S2 and then drags them with his/her fingers on the auxiliary tool 51 to move the two symbols S1 and S2 simultaneously. Even in a case where a plurality of symbols are specified in the example of FIG. 7, a configuration may be adopted in which one auxiliary tool 52 connected to the plurality of symbols is displayed and, by dragging on the auxiliary tool 52, the plurality of symbols are moved simultaneously.

The touch panel device 11 of this embodiment is a general-purpose display device for receiving information from a multiple number of sensors and displaying it; however, the present invention may be applied to a display device for displaying mainly one kind of information (e.g., nautical chart information). The present invention may also be applied to, for example, a plotter apparatus capable of displaying nautical chart information or a radar apparatus capable of displaying nautical chart information and a radar image.

The touch panel device may be, other than the display device to be installed in ships, a navigation device to be installed in movable bodies, such as automobiles and aircrafts. With a navigation device, the present invention may be used, for example, for moving a waypoint, a destination point, a point set by a user, and the like, similarly to the above embodiments. Moreover, the location displayed by the touch panel device based on the GNSS sensor is not limited to the location of the movable body concerned, and may be a location of another movable body. Moreover, the location displayed by the touch panel device is not necessarily a location of a movable body. Further, the present invention may be applied to a touch panel device having a configuration in which a location acquired from the GNSS sensor is not displayed.

In the present specification, the definition of the map includes, not only maps which are created for people, automobiles and the like to travel, but also maps which are created for aircrafts to travel.

DESCRIPTION OF REFERENCE NUMERAL(S)

1 Ship Instrument Network System
10 Ship Network
11 Touch Panel Device (Device having Touch Panel)
12 GPS Antenna (GNSS Sensor)
13 Radar Antenna
14 Fish Finder
15 Heading Sensor
16 Autopilot Device
21 Display Unit
22 User Interface
23 Memory
24 Detector
25 Controller
51, 52 Auxiliary Tool

What is claimed is:

1. A device having a touch panel, comprising:
a display unit for displaying, on a map or a nautical chart, a detected position acquired from a GNSS sensor and a symbol indicating a waypoint on the map or the nautical chart; and
a controller for controlling, when an operation of specifying the symbol is detected, an auxiliary tool to appear on a display screen of the display unit in a different position on the display screen than the position of the symbol, the auxiliary tool being configured to recognize a touch operation and move the symbol on the display screen according to the touch operation;
wherein the symbol and the auxiliary tool are displayed so as not to overlap each other on the display unit.

2. The device having the touch panel of claim 1, wherein the controller scrolls the map or the nautical chart to secure a display space for the auxiliary tool when displaying the auxiliary tool.

3. The device having the touch panel of claim 2, wherein an appearing position of the auxiliary tool is determined according to a displayed position of the specified symbol, and
wherein when at least a part of the auxiliary tool is detected to be out of the display screen, the controller scrolls the map or the nautical chart.

4. The device having the touch panel of claim 1, wherein the controller controls the auxiliary tool to appear below a displayed position of the specified symbol.

5. The device having the touch panel of claim 1, wherein at least two candidates for an appearing position of the auxiliary tool are set, and wherein the controller determines the appearing position of the auxiliary tool according to the displayed position of the specified symbol.

6. The device having the touch panel of claim 1, wherein an amount of movement on the display screen caused by the touch operation performed on the auxiliary tool is different from a moving amount of the symbol on the display screen.

7. The device having the touch panel of claim 1, wherein a relation between a displayed position of the specified symbol and an appearing position of the auxiliary tool is fixed.

8. The device having the touch panel of claim 7, wherein the controller moves the auxiliary tool according to the touch operation input by a user and moves the symbol such as to follow the movement of the auxiliary tool.

9. The device having the touch panel of claim 1, wherein the device is configured to be installed in a ship.

10. A radar apparatus comprising the device having the touch panel of claim 9.

11. A plotter apparatus comprising the device having the touch panel of claim 9.

12. A ship network system comprising the device having the touch panel of claim 9.

13. A method of displaying information, comprising:

displaying, on a map or a nautical chart, a detected position acquired from a GNSS sensor and a symbol indicating a waypoint on a navigation route from the detected position to a destination on the map or the nautical chart; and controlling, when an operation of specifying the symbol is detected, an auxiliary tool to appear on a display screen of the display unit in a different position on the display screen than the position of the symbol, the auxiliary tool being configured to recognize a touch operation and move the symbol on the display screen according to the touch operation;

wherein the symbol and the auxiliary tool are displayed so as not to overlap each other on the display unit.

14. A device having a touch panel, comprising:

a display unit for displaying a symbol indicating a waypoint on a navigation route on a map or a nautical chart; and a controller for controlling, when an operation of specifying the symbol is detected, an auxiliary tool to appear on a display screen of the display unit in a different position on the display screen than the position of the symbol, the auxiliary tool being configured to recognize a touch operation and move the symbol on the display screen according to the touch operation;

wherein the symbol and the auxiliary tool are displayed so as not to overlap each other on the display unit.

* * * * *